United States Patent
Gill et al.

(10) Patent No.: US 7,936,089 B1
(45) Date of Patent: May 3, 2011

(54) ADAPTIVE POWER ARCHITECTURE FOR HOT-SWAPPABLE ELECTRONIC MODULES

(75) Inventors: Jaspal Gill, Danville, CA (US); David Keith Owen, Livermore, CA (US); Troy Sheets, San Francisco, CA (US); Daniel Lewis Kline, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 959 days.

(21) Appl. No.: 11/461,292

(22) Filed: Jul. 31, 2006

(51) Int. Cl.
*H02J 1/00* (2006.01)
*G06F 13/00* (2006.01)

(52) U.S. Cl. .......................... 307/31; 710/100
(58) Field of Classification Search .............. 307/31; 710/100
See application file for complete search history.

(56) References Cited

U.S. PATENT DOCUMENTS

| | | | | |
|---|---|---|---|---|
| 5,859,975 A * | 1/1999 | Brewer et al. | .................. | 709/213 |
| 7,032,118 B2 * | 4/2006 | Hirezaki et al. | .............. | 713/310 |
| 7,325,733 B2 * | 2/2008 | Wurzburg et al. | ............ | 235/441 |
| 7,456,617 B2 * | 11/2008 | Chapuis et al. | ................ | 323/267 |
| 7,475,175 B2 * | 1/2009 | Klein et al. | .................... | 710/100 |
| 2004/0054937 A1 * | 3/2004 | Williams et al. | .............. | 713/300 |

\* cited by examiner

*Primary Examiner* — Jared J Fureman
*Assistant Examiner* — Adi Amrany
(74) *Attorney, Agent, or Firm* — Harrity & Harrity, LLP (57) ABSTRACT

A system may include a module that includes a component, a logic device to provide an instruction on behalf of the component, and control logic to generate a desired output voltage signal in response to a constant current, where the desired output voltage signal indicates a determined voltage that the component is configured to operate with when performing an operation. The system may include a board that includes a power supply to produce the determined voltage based on the instruction, and an interface to couple the determined voltage to the component to allow the component to perform the operation on behalf of the board, send the constant current to the control logic, and receive the desired output voltage signal from the control logic.

16 Claims, 6 Drawing Sheets

ADAPTIVE POWER ARCHITECTURE FOR HOT-SWAPPABLE ELECTRONIC MODULES

FIELD OF THE INVENTION

Implementations consistent with the principles of the invention relate generally to electronic devices, and more particularly, to a power supply for use in an electronic device.

BACKGROUND OF THE INVENTION

Electronic devices may be used in many types of systems and/or applications, such as control systems, data processing systems, medical systems, telecommunication systems and/or data communication networks. Electronic devices may include, for example, system controllers, servers, data acquisition systems, medical imaging systems, central office systems, and/or network devices, such as routers, switches, firewalls, and/or network address translators.

For some applications, it may be desirable to make electronic devices scalable to accommodate new application requirements. For example, a communication network may be expanded to accommodate new users, modified to accommodate new networking protocols and/or types of data traffic, and/or may be reconfigured in response to network attacks and/or natural disasters.

Scalable electronic devices may be designed to accommodate certain changes. For instance, an electronic device may be configured to include a chassis that accepts cards to provide flexibility for accommodating new application requirements. A card may include a device capable of receiving data from another device, performing operations on the data, and/or making data available to another device. Implementations of cards may take the form of foxed and/or removable cards or boards that are configured and adapted for use in an electronic device.

Cards may require varying supply voltages and/or currents based on the types of components operating on a card and/or types of operations performed by a card. In addition, different modules and/or components operating on a card may require still other supply voltages. For example, a card may support a first module requiring a first voltage, a second module requiring a second voltage, and a third module requiring a third voltage. Power supplies, such as direct current to direct current (DC/DC) converters, may be placed on the modules and/or card to produce the first, second, and/or third voltage. Moreover, multiple DC/DC converters may be placed on modules requiring more than one voltage. As a result, the amount of module space available for other types of components, such as data transfer components, may be reduced. Moreover, additional heat may be generated by the DC/DC converters on the modules thereby increasing cooling requirements for the modules and/or card.

SUMMARY OF THE INVENTION

In accordance with an aspect, a system is provided. The system may include a module that includes a component, a logic device to provide an instruction on behalf of the component, and control logic to generate a desired output voltage signal in response to a constant current, where the desired output voltage signal indicates a determined voltage that the component is configured to operate with when performing an operation. The system may include a board that includes a power supply to produce the determined voltage based on the instruction, and an interface to couple the determined voltage to the component to allow the component to perform the operation, send the constant current to the control logic, and receive the desired output voltage signal from the control logic.

In accordance with another aspect, a device is provided. The device may include a direct current to direct current (DC/DC) converter configured to produce a desired output voltage to cause a component on a removable module to perform an operation, receive a desired voltage signal from the removable module, where the desired voltage signal is related to the desired output voltage, and receive an instruction related to the desired output voltage. The DC/DC converter may further produce a constant current to cause a monitoring component to produce the desired voltage signal on behalf of the component, where the desired voltage signal indicates a value of the desired output voltage that the component is configured to use when performing the operation. The device may include a header configured to removably support the module in a relationship with the device, pass the desired voltage signal from the removable module to the DC/DC converter, and pass the desired output voltage from the DC/DC converter to the removable module.

In accordance with yet another aspect, a removable module is provided. The removable module may include a component to perform an operation in response to an applied voltage. The removable module may include a logic device to receive a bias voltage from a main board, power up in response to the bias voltage, and send a control signal to a device or a supply on the main board to cause the supply to produce the applied voltage. The removable module may include control logic to produce a desired voltage signal in response to a constant current received from the main board, where the desired voltage signal is adapted to cause a supply to provide the applied voltage to the component.

In accordance with still another aspect, an electronic device is provided. The electronic device may include means for receiving a control signal from a logic device; means for providing a first instruction to a direct current to direct current (DC/DC) converter supported on a main board within the electronic device in response to the control signal; means for providing a supply voltage to a component on a removable module supported on the main board in response to the instruction; means for receiving a desired output voltage signal from a monitor on the removable module, wherein the desired output voltage signal is used by the DC/DC converter to generate the supply voltage; and means for removing the supply voltage in response to a second instruction.

In accordance with yet another aspect, a system is provided. The system may include a main board that includes direct current to direct current converters, and a physical interface card to instruct the DC/DC converters to provide the physical interface card with one or more voltages having predetermined characteristics.

In accordance with still another aspect, a routing device is provided. The routing device may include a physical interface card configured to perform one or more operations, and a main board connected to the physical interface card, the main board that includes one or more direct current to direct current converters to provide one or more voltages to the physical interface card, the one or more voltages having predetermined characteristics to allow the physical interface card to perform the one or more operations.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may allow plug-in cards, such as physical interface cards (PICs), to be powered via substantially any number of voltages without requiring placement of DC/DC converters on the PICs. As a result, space on a PIC may be available to receive other types of components, such as data transfer components, processing components, etc. In one implementation, a logic device, such as a complex logic device (CPLD), may operate on a PIC and may instruct a logic device (e.g., another CPLD) operating on the main board to provide one or more DC voltages to the PIC at determined amplitudes and having determined characteristics, such as voltage rise time curves. The main board logic device may instruct one or more DC/DC converters operating on the main board to provide voltages at the specified amplitudes and with specified characteristics (e.g., rise time curves) to the PIC.

In another implementation, a logic device on the PIC may communicate with DC/DC converters operating on the main board and may instruct the DC/DC converters to provide the PIC with one or more voltages having determined characteristics.

Implementations may allow a PIC to be made smaller, operate with less power, and/or generate less heat as compared to prior art plug in modules that utilize one or more DC/DC converters thereon to produce voltages needed to power components on the prior art plug in modules.

Exemplary Electronic Device Configuration

Figure 1:
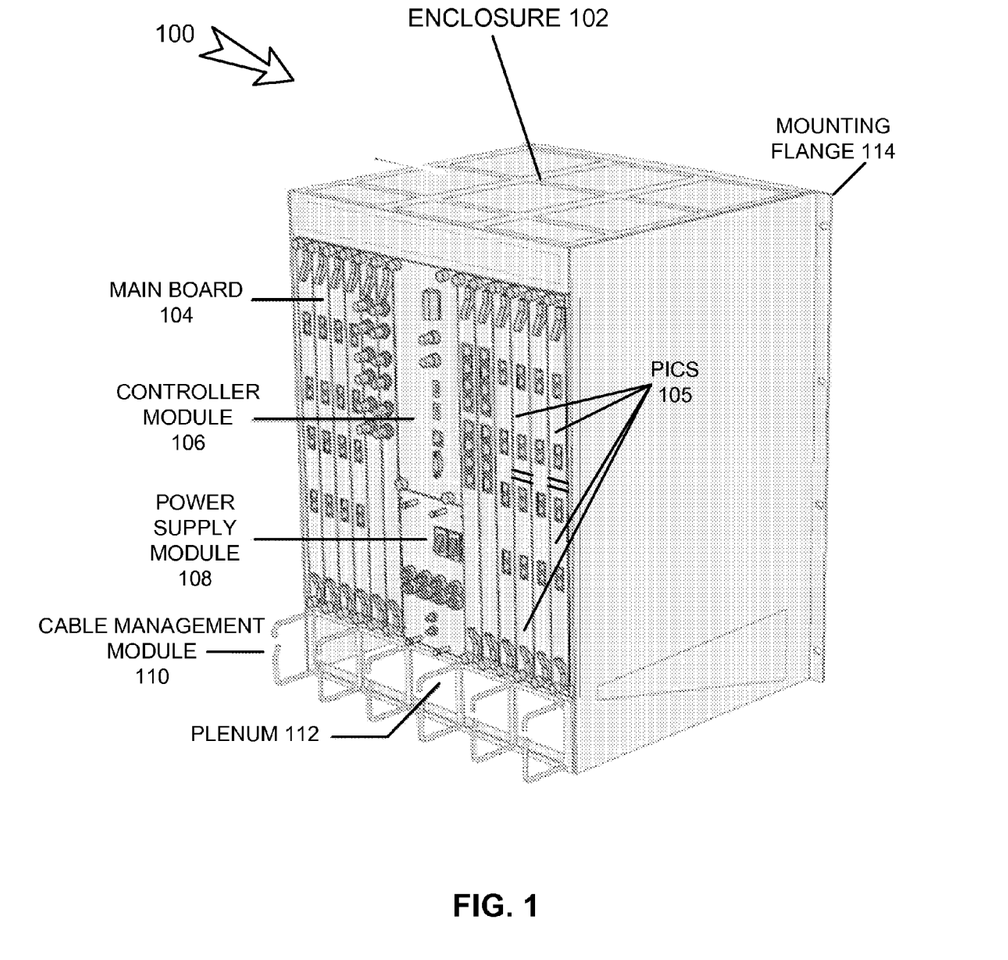
FIG. 1 illustrates an exemplary electronic device that accepts main boards that support physical interface cards consistent with principles of the invention.

FIG. 1 illustrates an exemplary electronic device 100 that accepts main boards that support PICs. Electronic device 100 may include an enclosure 102, a main board 104, PICs 105, a controller module 106, a power supply module 108, a cable management module 110, a plenum 112, and a mounting flange 114. In other implementations, electronic device 100 may be configured differently.

Enclosure 102 may include any structure that can be configured to act as a housing to retain and/or protect a chassis, fixed cards or removable cards (e.g., main boards 104), and/or other modules (e.g., PICs) that may be used to facilitate operation of electronic device 100. Enclosure 102 may be fabricated from metal, plastic and/or composite and may be sized for particular applications. In one implementation, enclosure 102 may be sized to fit an industry standard mounting structure, such as an equipment rack. Enclosure 102 may include one or more mounting flanges 114 to facilitate attachment of enclosure 102 to a mounting structure, such as an equipment rack. Mounting flange 114 may include one or more mounting holes for accepting fasteners, such as machine screws, for use in attaching electronic device 100 to a mounting structure.

Main board 104 may include devices and/or components that are configured to perform a function while installed in electronic device 100. Main board 104 may be configured to perform certain functions using a combination of hardware and/or software components. For example, in one implementation, main board 104 may be configured to perform packet forwarding, network address translation, data encryption, data processing, and/or data storage using hardware and/or software components. Implementations of main board 104 may be adapted to support one or more PICs, where the PICs are configured to perform certain operations on behalf of main board 104.

PICs 105 may include devices and/or components adapted to perform one or more functions on behalf of one or more main boards 104 and/or other devices. PICs 105 may be configured to perform certain functions using a combination of hardware and/or software components. In one implementation, PICs 105 may be on the order of one-half, one-third, one-quarter, etc., of the height of a main board 104 and may be inserted or removed via a front face of enclosure 102. Other PICs 105 may have other heights, widths, and/or depths. Implementations of PICs 105 may be hot-swappable in that PICs 105 may be inserted and/or removed from enclosure 102 while power is applied to a chassis supplying PICs 105.

In an implementation, main board 104 may be removably coupled to electronic device 100 using fasteners, catches, and/or other retaining mechanisms. Main board 104 may be configured to have a predetermined height and/or depth so as to be supported by a chassis inside electronic device 100. In one implementation, main board 104 may have dimensions on the order of approximately 15 inches high by approximately 8 inches deep.

Controller module 106 may include devices and/or components configured to control and/or monitor the operation of one or more main boards 104 operating in electronic device 100. Implementations of controller module 106 may include a special-purpose computer and/or other type of device. Power supply module 108 may include any device capable of providing power to devices operating in electronic device 100. Power supply module 108 may perform voltage and/or current conversion and may include one or more inputs and/or outputs. In one implementation, power supply module 108 may accept an alternating current (AC) from a wall receptacle and may provide a direct current (DC) to main board 104. For example, power supply module 108 may provide a DC voltage to one or more main boards 104.

Cable management module 110 may include any device, mechanism and/or structure configured to retain and/or manage cables. In one implementation, cable management module 110 may include guides and/or channels for retaining wires and/or optical fibers associated with main board 104, controller module 106 and/or power supply module 108. Plenum 112 may include any device, mechanism and/or structure that facilitates and/or directs airflow through electronic device 100. In one implementation, plenum 112 may include one or more openings, or channels, for accepting an input air volume and directing the input air volume across interior portions of main boards 104, controller module 106, power supply module 108, PICs, and/or other devices, components and/or cards operating in electronic device 100.

Exemplary Main Board

Figure 2:
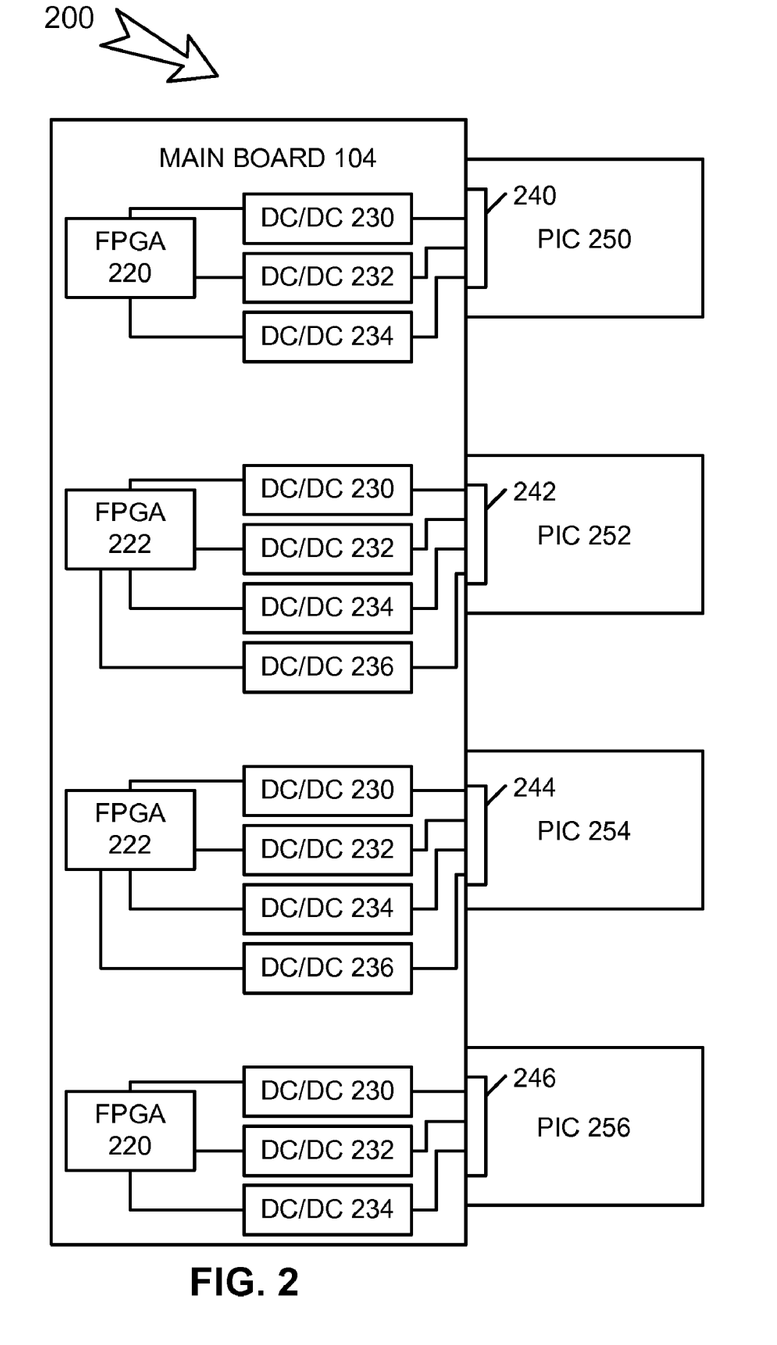
FIG. 2 illustrates a schematic representation of an exemplary portion of a main board supporting multiple physical interface cards consistent with principles of the invention.

FIG. 2 illustrates a schematic representation of an exemplary portion 200 of electronic device 100 that includes main board 104 supporting multiple PICs 250, 252, 254, 256. Portion 200 may include main board 104 and PICs 250, 252, 254, 256 (collectively PICs 250). Main board 104 may include field programmable gate array (FPGA) 220 and 222, DC/DC converter 230, 232, 234, 236 (collectively DC/DC converters 230), and headers 240, 242, 244, 246 (collectively headers 240).

Main board 104 may include substantially any number of components to perform operations on behalf of electronic device 100. For example, main board 104 may include components to perform operations, such as packet forwarding. Main board 104 may use removable modules, such as PICs 250, to perform operations related to packet forwarding. For example, main board 104 may use PIC 250 to perform Ethernet aggregation, PIC 252 to maintain an OC192 line interface, and PIC 254 to maintain an O0768 line interface. Removable modules used with main board 104 may be designed to be field replaceable units (FRU's) that can be added and/or removed from main board 104 to meet the demands of electronic device 100.

Main board 104 may include one or more power conversion devices, such as DC/DC converters 230 to provide power to PICs 250. DC/DC converters 230 may be installed on main board 104 to provide more space on PICs for other types of components, such as components used to perform data operations. Maintaining DC/DC converters 230 on main board 104 may further lessen heat generation as compared to heat generation that might occur when each PIC has one or more DC/DC converters operating thereon.

FPGA 220/222 may include a device, such as a type of complex logic device (CPLD), that processes instructions and performs an operation based on the processed instructions. In an implementation, FPGA 220/222 may include logic that controls one or more DC/DC converters 230. In other implementations, FPGA 220/222 may include logic that performs other functions, such as communication functions, control of other devices, etc.

FPGA 220/222 may be programmed to cause DC/DC converters 230 to produce a determined output voltage, maintain the determined output voltage within a specified range, provide the determined output voltage according to a determined rise time (e.g., a time period over which an output voltage goes from zero volts to a steady state output voltage level). FPGA 220/220 may further be programmed to sequentially start DC/DC converters 230 according to determined criteria. For example, DC/DC converter 232 may need to be powered up 10 milliseconds (ms) before DC/DC converter 234. FPGA 220/222 may provide signals to DC/DC converters 232 and 234 at differing times so as to power up DC/DC converter 232 10 ms before DC/DC converter 234 is powered up.

In implementations using multiple FPGAs, the FPGAs may be configured to turn on in a determined sequence. For example, in a configuration using three FPGAs, a first FPGA may be configured to turn on before a second FPGA and the second FPGA may be configured to turn on before the third FPGA. Implementations using multiple FPGAs may be configured so that none of the FPGAs and/or only certain FPGAs turn on when one or more of the FPGAs turns on out of sequence or does not turn on at the determined time. An error message may be generated on behalf of an FPGA that does not operate in a determined manner.

DC/DC converters 230 may include devices to convert an input voltage and/or current to an output voltage and/or current. For example, DC/DC converter 232 may receive an input voltage of 5 volts (V) and may produce an output voltage of 1.8V and DC/DC converter 234 may receive an input voltage of 2.0V and may produce an output voltage of 3.3V. DC/DC converters 230 may be fixed (i.e., have a single output voltage) and/or may be programmable (i.e., can be configured to have varying output voltages). DC/DC converters 230 may be configured to operate together, such as by load sharing, when providing supply voltages to components on PICs 250.

DC/DC converters 230 may be linear and/or switched and may include filtering (e.g., to reduce noise on an output line), current and/or voltage sensing devices (e.g., to determine if an output voltage is within a determined range), etc. In an implementation, FPGA 220 may control one or more DC/DC converters 230 for a plug in module, such as PIC 250, 252, 254, or 256. DC/DC converters 230 may receive control signals from internal and/or external sensing devices and/or networks to adjust an output voltage and/or output current and/or to maintain an output voltage/output current at determined values.

DC/DC converters 230 may be used as power rails to PICs 250. For example, DC/DC converter 232 may provide a first power rail at a first voltage (e.g., 0.8 volts) and DC/DC converter 234 may provide a second power rail at a second voltage (e.g., 3.3 volts). Implementations of DC/DC converters 230 may be configured to remain in an "off" state until a PIC 250, 252, 254 and/or 256 is plugged into a header 240, 242, 244, and/or 246.

DC/DC converters 230 may be configured to turn on according to a pre-determined sequence when respective DC/DC converters sense that PIC 250, 252, 254 and/or 256 is plugged into header 240, 242, 244, and/or 246. DC/DC converters 230 may include over current protection on outputs of DC/DC converters to prevent damage to PICs 250 while PICs 250 are plugged into and/or removed from headers 240 when power is applied thereto.

Headers 240 may include structures that connect main board 104 to one or more PICs 250. Implementations of headers 240 may provide electro-mechanical connectivity and may allow main board 104 to support PICs 250 while sending power and/or data to PICs 250 and/or receiving data from PICs 250. Headers 240 may include insertion type connections and may include substantially any number of connection devices, such as pins, sockets, etc. Headers 240 may pass electrical and/or optical signals from a source to a destination.

PICs 250 may include removable modules adapted to perform operations. For example, PICs 250 may be hot swappable modules that perform operations on behalf of a host device, such as main board 104. "Hot swappable," as used herein, refers to a module, device, and/or component that can be connected and/or disconnected from a host device while power is applied to the module, device and/or component or to an interface (e.g., header 240) located between the host device and the module, device and/or component. Implementations may employ current limiting devices in hot swappable configurations to prevent damage to main board 104 and/or PICs 250. For example, a metal oxide semiconductor field effect transistor (MOSFET) device may be used to protect main board 104 and/or PICs 250 during hot swapping.

PICs 250 may include modules that may require a number of different supply voltages and/or currents to operate. Implementations of PICs 250 may use substantially any number of supply voltages. In an implementation, PICs 250 may use from one to seven different supply voltage levels. For example, a PIC may use voltages ranging from 0.8V to 5V and current levels from a few milliamps to on the order of 20 amps. Supply voltages on PICs 250 may be controlled to within determined limits, e.g., within ±0.02V-0.10V.

PICs 250 may include logic to monitor DC/DC converters 230 individually and/or collectively. For example, PIC 254 may require four supply voltages that may be supplied by DC/DC converters 230, 232, 234, 236. PIC 254 may control each DC/DC converter individually and/or may include logic to control DC/DC converters 230, 232, 234, 236 as a group. For example, PIC 254 may control DC/DC converters 230, 232, 234, and/or 236 as a group in order to synchronize when output voltages for certain DC/DC converters turn on/off and/or to synchronize output voltage rise times for DC/DC converters 230, 232, 234, 236.

PICs 250 may be sized so that main board 104 can support a number of PICs 250. In one implementation, PICs 250 may be on the order of 7 inches long×7 inches wide×1.25 inches high. In another implementation, PICs 250 may be on the order of 7 inches long×4 inches wide×1.3 inches high. Still other implementations of PICs 250 may have other dimensions.

Exemplary Power Supply Implementations

Figure 3:
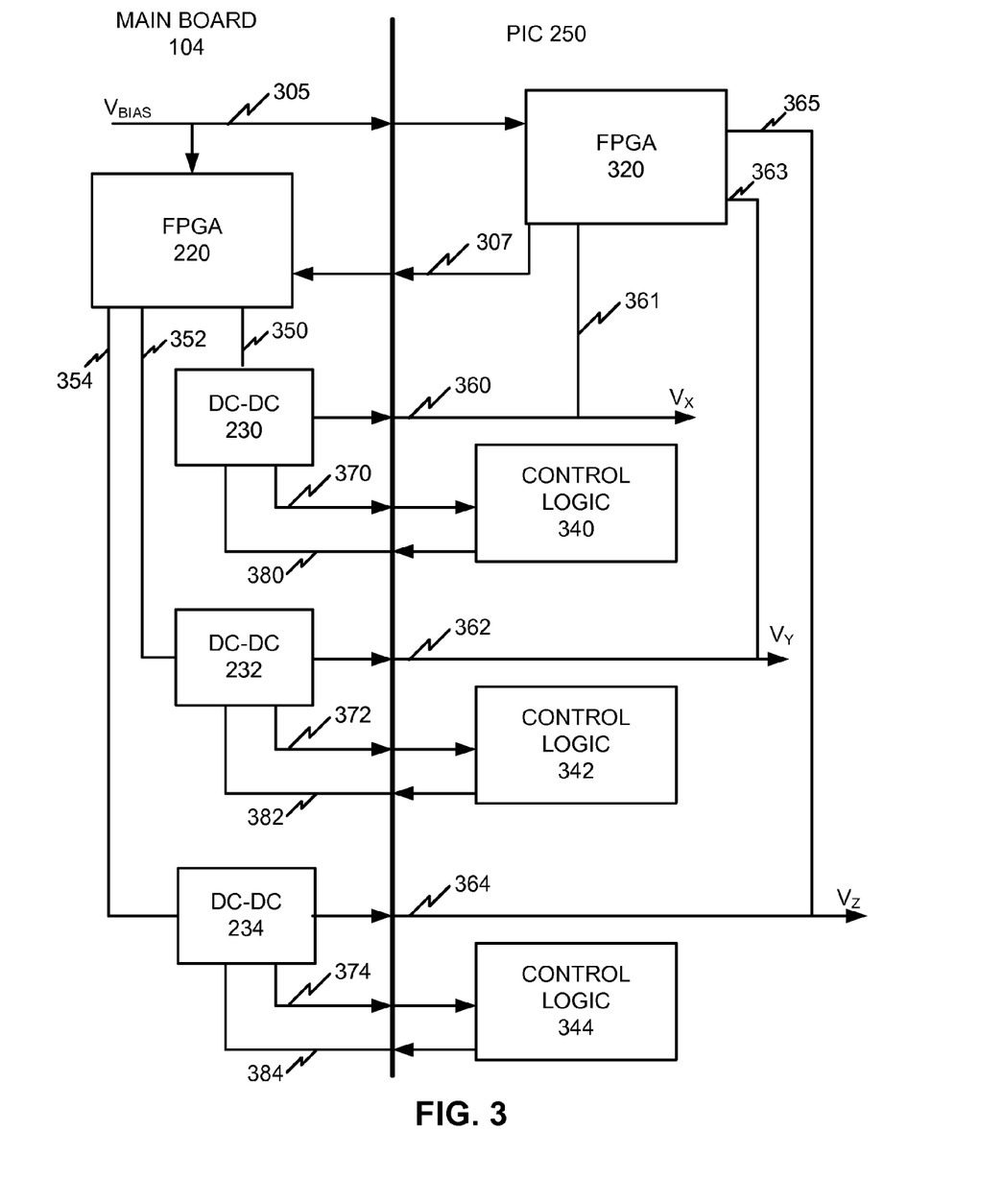
FIG. 3 is a block diagram of an implementation for providing power to one or more physical interface cards consistent with principles of the invention.

FIG. 3 is a block diagram of an implementation for providing power to one or more PICs 250. The implementation of FIG. 3 illustrates a relationship that may utilize FPGAs on main board 104 and PIC 250 to control the operation of DC/DC converters 230, 232, 234. The implementation of FIG. 3 may include main board 104, FPGA 220, DC/DC converters 230, 232, and 234, PIC 250, FPGA 320, and control logic 340, 342, and 344 (referred to collectively as control logic 340).

FPGA 320 may be similar to FPGA 220 described in connection with FIG. 2. FPGA 320 may be programmed to specify output voltage levels for DC/DC converters 230, 232, 234, start-up and/or power-down timing and/or sequencing of the power rails (e.g., outputs of DC/DC converters 230, 232, 234), and/or rise times for one or more power rails. For example, FPGA 320 may be pre-programmed to bring up DC/DC converters 230, 232, and 234 in a determined sequence (e.g., by imposing a programmable delay between the start of DC/DC converter 230 and DC/DC converter 232). In an implementation, FPGA 320 may be the first device powered up when PIC 250 is inserted into header 240. For example, FPGA 320 may be powered by a bias voltage 305 that causes FPGA 320 to power up when PIC 250 is inserted into header 240.

FPGA 320 may produce control signal 307 upon power up. Control signal 307 may instruct FPGA 220 to power up a particular DC/DC converter, e.g., DC/DC converter 230. Control signal 307 may further instruct FPGA 220 as to when to power up other DC/DC converters, such as DC/DC converters 232 and 234.

Control logic 340 may include a module, device or component that controls an output voltage related to a DC/DC converter. For example, an implementation of control logic 340 may receive a constant current signal, such as constant current signal 370, 372, 374, and may produce a desired output voltage signal, such as desired output voltage signal 380, 382, 384, that can be used by a power supply device (e.g., DC/DC converters 230, 232, 234) to provide a desired output voltage 360, 362, 364. Control logic 340 may operate on PICs, such as PIC 250, and may allow DC/DC converters 230 to be adaptively controlled so that DC/DC converters 230 provide PIC 250 with determined voltages, such as output voltages $V_x$(360), $V_y$(362), and $V_z$(364), where voltages $V_x$, $V_y$, $V_z$ can be used to power components operating on PIC 250.

Control logic 340 may include active components (e.g., amplifiers, filters, etc.) and/or passive components (e.g., resistors, capacitors, inductors, etc.). In an implementation, control logic 340 may include one or more resistor-capacitor (RC) networks. The RC networks may produce a desired output voltage signal 380, 382, 384 in response to a constant current signal 370, 372, 374.

Instructions 350, 352, 354 may be generated by FPGA 220 in response to control signal 307. FPGA 220 may send instructions 350, 352, 354 to DC/DC converters 230, 232, and 234, respectively, after receiving control signal 307. Instructions 350, 352, 354 may include signals that cause DC/DC converters 230, 232, 234, respectively, to perform desired actions. For example, instruction 352 may turn on DC/DC converter 232 and/or may ramp up an output of DC/DC converter 232 at a determined rate (e.g., a certain number of volts per milli-second).

Output voltage 360, 362, 364 may include a voltage produced by DC/DC converter 230, 232, 234 that provides a component on PIC 250 with a supply voltage. Output voltages 360, 362, 364 may act as power rails for components on PIC 250.

Feedback voltages 361, 363, and 365 may include voltages fed to FPGA 320 to allow FPGA 320 to determine whether output voltages 360, 362, and/or 364 are at determined levels, respectively. For example, feedback voltage 361 may be used by FPGA 320 to determine when output voltage 360 is at a determined level, such as a desired output voltage level.

Constant current signal 370, 372, 374 may include a current that is used by control logic 340, 342, 344 to produce a desired output voltage signal.

Desired output voltage signal 380, 382, 384 may include a signal that represents a voltage used by a component on PIC 250. Desired output voltage signal 380, 382, 384 may cause output voltage 360, 362, 364 to increase, decrease, or remain at a fixed value. Implementations of desired voltage signal 380, 382, 384 may compensate for losses in DC/DC converters 230, 232, 234, monitors 240, 242, 244 and/or other devices, components or structures (e.g., wires or circuit board traces) used on main board 104 and/or PICs 250.

Figure 4:
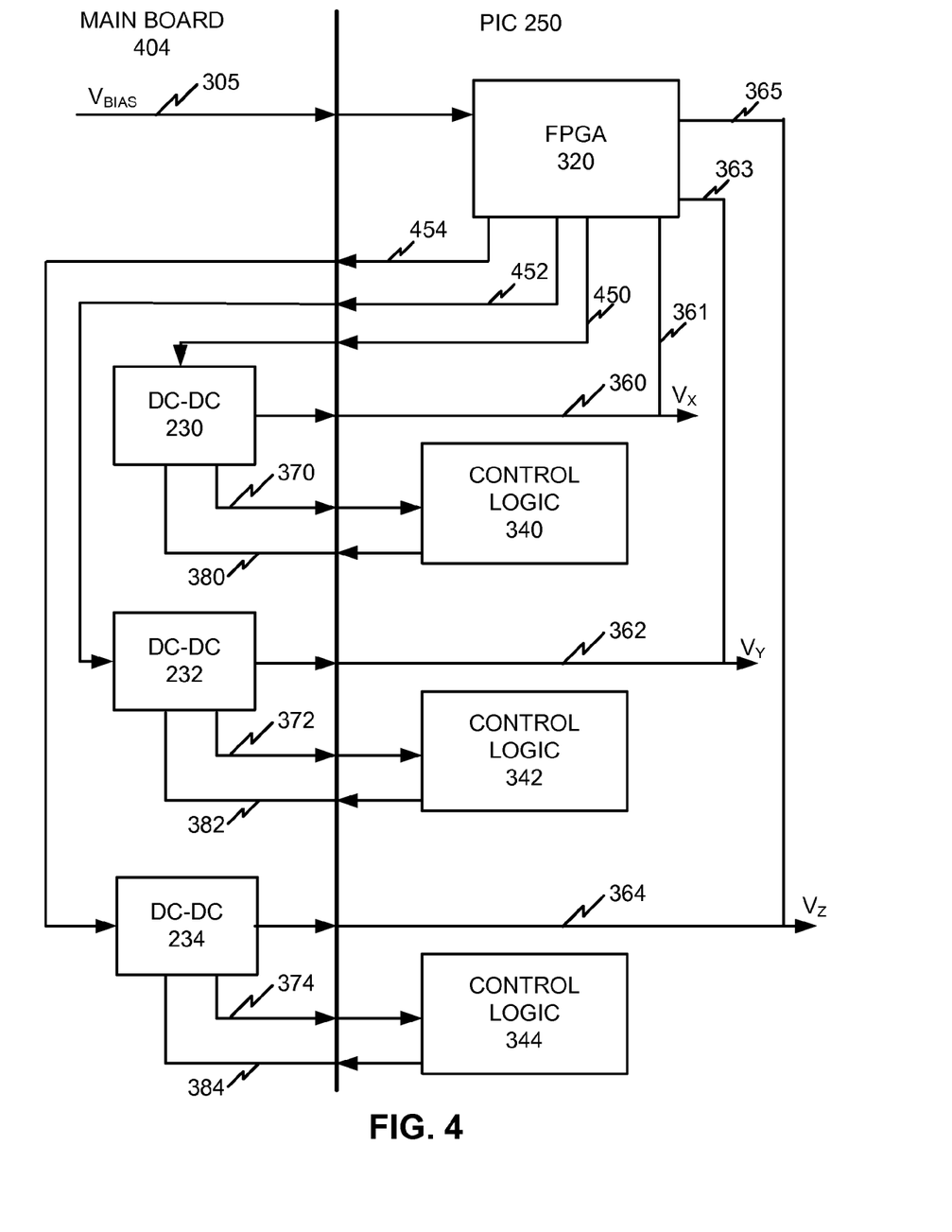
FIG. 4 is a block diagram of another implementation for providing power to one or more physical interface cards consistent with principles of the invention.

FIG. 4 is a block diagram of another implementation for providing power to one or more PICs. The implementation of FIG. 4 operates in a manner similar to that of the implementation of FIG. 3. The implementation of FIG. 4 may not include an FPGA on main board 104 to provide instructions 350, 352 and 354 (FIG. 3) to DC/DC converters 230, 232, and 234, respectively.

In the implementation of FIG. 4, FPGA 320 receives bias voltage 305 from main board 104. FPGA 320 may be the first component on PIC 250 to power up via bias voltage 305 and may provide instructions 450, 452 and 454 to DC/DC converters 230, 232, and 234, respectively. Instructions 450, 452, 454 may cause DC/DC converters 230, 232, 234 to power up according to a predetermined sequence. Instructions 450, 452, 454 may further determine an output voltage 360, 362, 364 for DC/DC converters 230, 232, 234 in a manner similar to that described above with respect to FIG. 3.

Exemplary Voltage Waveforms

Figure 5:
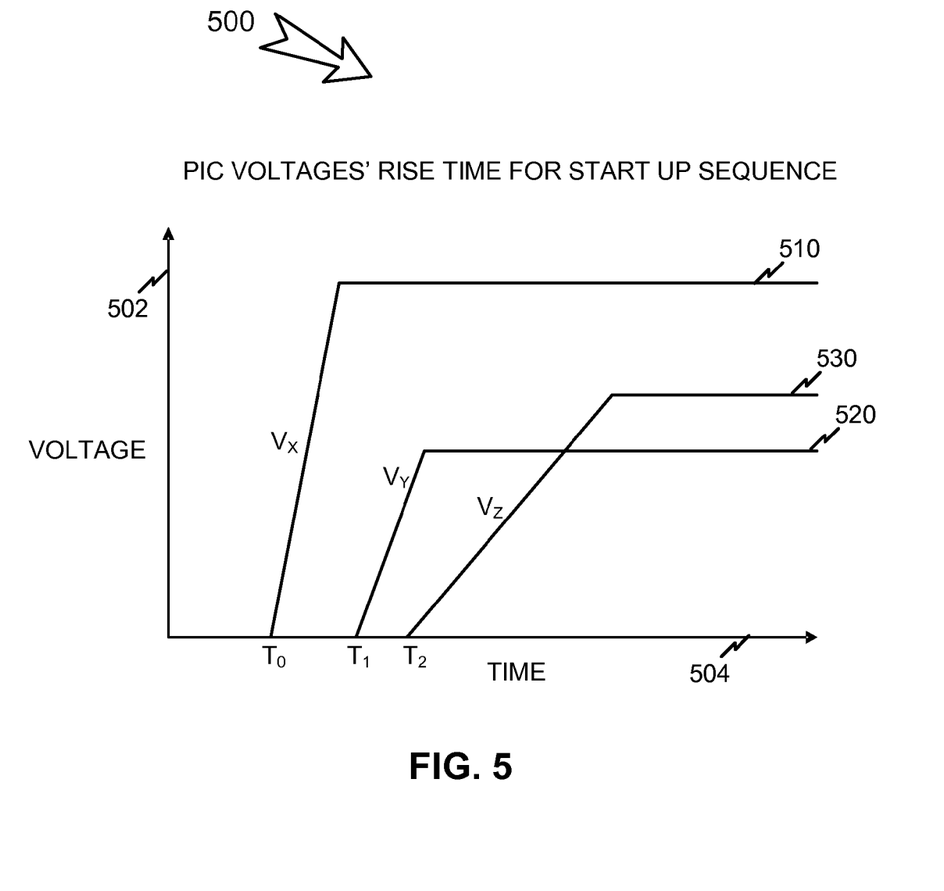
FIG. 5 illustrates amplitude as a function of time for output voltages $V_x$, $V_y$ and $V_z$ consistent with principles of the invention.

FIG. 5 illustrates amplitude as a function of time for output voltages $V_x$, $V_y$, and $V_z$. Plot 500 may include a voltage axis 502 and a time axis 504. Voltage axis 502 may have units of micro-volts, milli-volts, volts, kilo-volts, etc., and time axis 504 may have units of micro-seconds, milli-seconds (ms), seconds, etc. Plot 500 is provided purely of explanatory purposes.

Line 510 may represent a waveform for output voltage 360 ($V_x$) related to DC/DC converter 230. Output voltage 360 may start at time $T_0$ and may have a slope related thereto as output voltage 360 approaches a steady state value (represented by the horizontal portion of line 510). For example, FPGA 220/320 (FIG. 3) and/or FPGA 320 (FIG. 4) may indicate that output voltage 360 should be 3.3V (i.e., the steady state value of output voltage 360 should be 3.3V). FPGA 220/320 may instruct DC/DC converter 230 to power on at time $T_0$, and control logic 340 may instruct DC/DC converter 230 to maintain a determined slope during power on until the steady state amplitude (3.3V) is achieved (e.g., control logic 340 may indicate that output voltage $V_x$ 360 should go from 0V at time $T_0$ to 3.3V at a time of 10 ms). Output voltage $V_x$ 360 may rise from 0V to 3.3V over a 10 ms time interval and may reach a steady state voltage of 3.3V at the end of the 10 ms time interval.

Lines 520 and 530 may be related to output voltage $V_y$ 362 and $V_z$ 364, respectively. From plot 500, it is observed that output voltage $V_y$ 362 powers on after output voltage $V_x$ 360 and before output voltage 364. From plot 500, it is further observed that output voltage $V_y$ 362 is lower in amplitude than output voltages $V_x$ 360 or $V_z$ 364 and that output voltage $V_y$ 362 has a rise time slope that is longer than the rise time slope of output voltage $V_x$ 360, but shorter than the rise time slope of output voltage $V_z$ 364.

Exemplary Method

Figure 6:
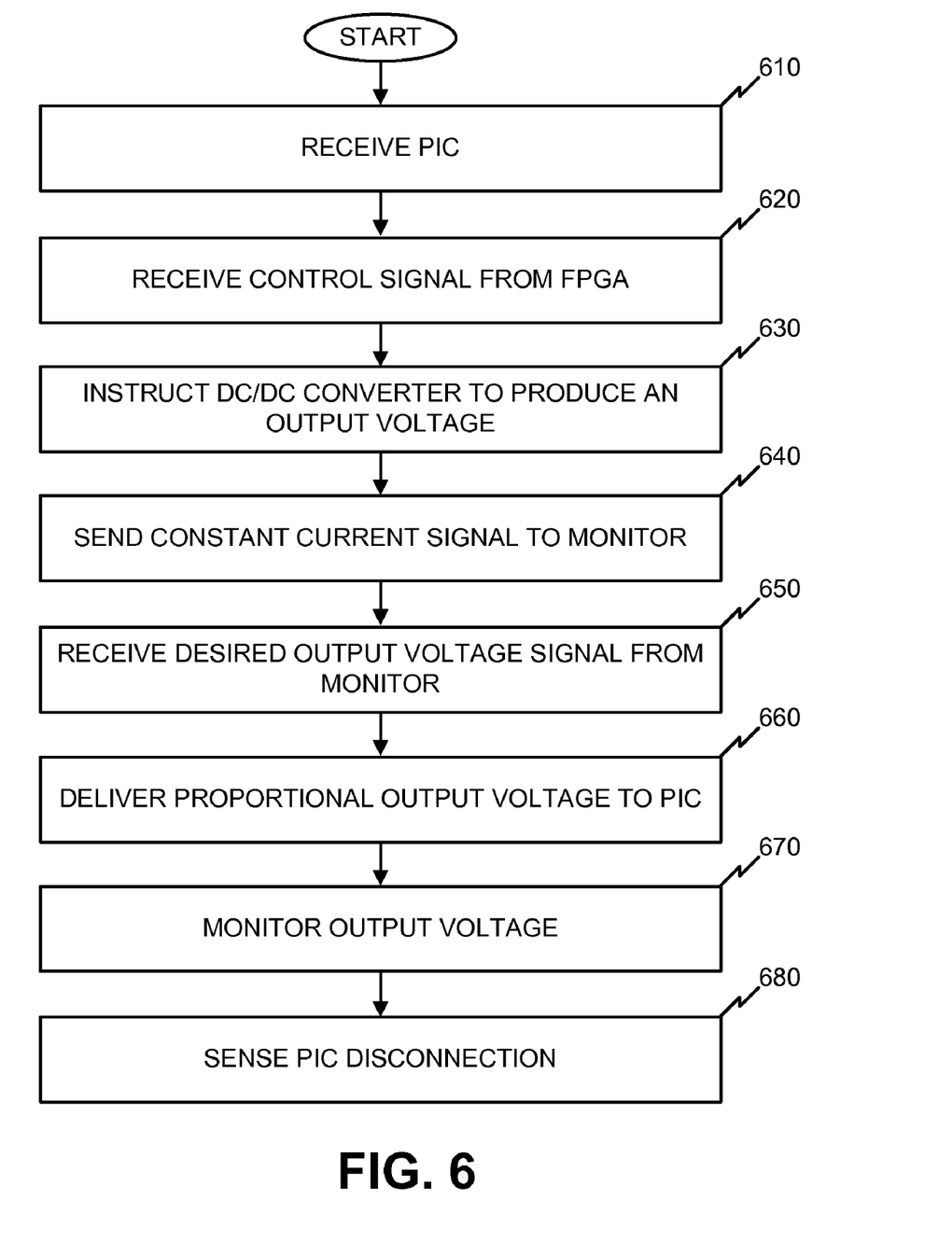
FIG. 6 illustrates an exemplary method for applying power to a physical interface card consistent with principles of the invention.

FIG. 6 illustrates an exemplary method for applying power to a PIC. Main board 104 may receive PICs 250 (block 610). For example, main board 104 may receive PIC 252 (e.g., an OC 192 line interface) and PIC 254 (e.g., an OC 768 line interface) to allow main board 104 to send and/or receive traffic via a network. PICs 252, 254 may plug into headers 242, 244, respectively. Headers 242, 244 may allow hot swapping of PICs 252, 254 so that main board 104 can remain powered up while PICs 252, 254 are installed or removed. Headers 242, 244 may provide power rails to PICs 252, 254 and/or may send and/or receive information (e.g., control information) to/from PICs 252, 254.

Main board 104 may receive control signal 307 from FPGA 320 (block 620). Voltage 305 may power up FPGA 320 when PIC 250 (FIG. 3) is inserted into header 240. FPGA 320 may issue control signal 307 to FPGA 220 upon power up. Control signal 307 may cause FPGA 220 to produce one or more instructions that can be used to control the operation of one or more power supply devices. For example, FPGA 220 may produce instructions 350, 352, 354 to cause DC/DC converters 230, 232, 234, respectively, to perform a desired action.

In an implementation, instructions 350, 352, 354 may instruct DC/DC converters 230, 232, 234 to produce output voltages 360 ($V_x$), 362 ($V_y$), and 364 ($V_z$), respectively (block 630). Logic in DC/DC converter 230, 232, 234 may cause DC/DC converter 230, 232, 234 to produce a determined output voltage. Implementations of DC/DC converter 230, 232, 234 may be adaptable power supplies and may produce substantially any output voltage within a determined range based on instructions 350, 352, 354. For example, DC/DC converter 232 may have an output range of 0.8V to 3.3V and may be able to produce any output voltage within this output range, such as 0.9V, 1.0V, 1.1V, etc., based on instruction 352. Output voltages 360, 362, 364 may be configured to operate as supply rails for components on PIC 250.

DC/DC converters 230, 232, 234 may produce constant current signals 370, 372, 374, respectively, and may send constant current signals 370, 372, 374 to control logic 340, 342, 344 (block 640). For example, constant current signals 370, 372, 374 may be produced from constant current sources operating in DC/DC converters 230, 232, 234, respectively.

A constant current source may be used to generate a voltage across a resistor and capacitor residing on PIC 250. For example, control logic 340, 342, 344 may include RC networks, respectively. The value of the RC combination in control logic 340, 342, 344 may be selected to produce a desired voltage signal 380, 382, 384 having a rise time and steady state level that may be equivalent to a desired output voltage, e.g., 360 ($V_x$), 362 ($V_y$), and 364 ($V_z$), of a particular power rail (DC/DC converter output).

Main board 104 may receive desired output voltage signals from control logic 340, 342, 344 (block 650). For example, control logic 340, 342, 344 may send desired output voltage signals 380, 382, 384, respectively, to control portions of DC/DC converters 230, 232, 234, respectively, to cause DC/DC converters 230, 232, 234 to produce determined output voltages.

DC/DC converters 230, 232, 234 may provide proportional output voltages 360, 362, 364, respectively, to PIC 250 (block 660). For example, DC/DC converters 230, 232, 234 may produce output voltages 360, 362 364 that mimic desired output voltage signals 380, 382, 384, respectively. Control logic 340, 342, 344 may allow parameters related to a power rail to be dictated by specifications programmed into a logic device of a PIC making a request for a determined output voltage (e.g., $V_x$, $V_y$, $V_z$). For example, control logic 340, 342, 344 may operate with FPGA 320 and/or 322 to produce desired output voltages $V_x$(360), $V_y$(362), $V_z$(364). Control logic 340, 342, 344 may allow parameters related to a supply rail (e.g., start up time, rise time, steady state voltage level, etc.) to be dictated by specifications programmed into PFGA 320 (i.e., a logic device operating on behalf of PIC 250). For example, FPGA 320 may make a request (via control signal 307) for desired output voltage 360, 362, 364. FPGA 320, operating alone or in combination with FPGA 220, may further power up other power rails related to PIC 250 according to RC networks related to the other power rails and/or based on code in FPGA 320/220.

FPGA 320 may monitor output voltages 360, 362, and 364 via feedback voltages 361, 363, and 365, respectively (block 670). For example, FPGA 320 may monitor feedback voltage 361 to determine whether DC/DC converter 230 is providing a determined output voltage 360 to PIC 250. In one implementation, block 670 may feedback to block 620 whereby DC/DC converter 230 is providing the desired output voltage 360.

Main board 104 may sense the disconnection of PIC 250 (block 680). FPGA 320/220 may further be programmed to power down power rails in a determined sequence when functions performed by PIC 250 are no longer needed by main board 104.

Main board 104 may be configured to have DC/DC converters 230, 232, 234 turn off when PIC 250 is disengaged from header 240. Bias voltage 305 may also be removed from header 240 when PIC 250 is disengaged form header 240.

Conclusion

Implementations consistent with principles of the invention may allow a main board to power up components on a PIC without requiring that the PIC include power supplies, such as DC/DC converters, thereon.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 6, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-4, depending on specific deployments and/or applications. Moreover, characteristics of waveforms, such as those shown in FIG. 5, may be changed without departing from the spirit of the invention. Further, disclosed implementations may not be limited to any specific combination of hardware.

Further, certain portions of the invention may be implemented as "logic" that performs one or more functions. This logic may include hardware, such as hardwired logic, an application specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A system, comprising:
    a module comprising:
        a component,
        a logic device to provide an instruction to a board to power up a power supply, on the board, that is powered down, the provided instruction including start-up timing information and power-down timing information, the power supply being powered up based on the start-up timing information,
        where the power supply is powered down, after being powered up, based on the power-down timing information, and
        control logic to:
            receive, from the board and in response to the provided instruction, a constant current,
            generate, in response to receiving the constant current from the board and based on a desired voltage that the component is to operate with when performing an operation, a desired output voltage signal, where the desired output voltage signal corresponds to the desired voltage that the component is to operate with when performing the operation, and
            send the desired output voltage signal to the board,
        where the logic device and the control logic are physically separate; and the board comprising:
            the power supply to produce, based on the desired voltage signal, the desired voltage, and
            an interface to:
                send, in response to receiving the provided instruction, the constant current to the control logic,
                receive the desired output voltage signal from the control logic, and
                send the desired voltage to the component to allow the component to perform the operation, in response to receiving the desired output voltage signal.

2. The system of claim 1, where the module includes a field replaceable unit.

3. The system of claim 1, where the module includes a hot swappable module.

4. The system of claim 1, where the logic device is powered via a bias voltage from the board.

5. The system of claim 1, where the power supply includes a direct current to direct current (DC/DC) converter.

6. The system of claim 1, where the interface releasably supports the module with respect to the board.

7. The system of claim 1, where the board further comprises:
    a second power supply to produce a second determined voltage based on a second instruction, where the second determined voltage is used by the component, another component included in the system, or another component external to the system.

8. The method of claim 7, where the second instruction is provided by the logic device, and where the second power supply is to be powered up based on and in response to start-up timing information included in the second instruction, the second power supply being powered down prior to the second instruction.

9. A removable module, comprising:
    a logic device to:
        receive a bias voltage from a main board,
        power up in response to receiving the bias voltage, and
        send a control signal to at least one of a device or a power supply, on the main board, to cause the power supply to power up, in response to the control signal, and produce at least one of an applied voltage or a current, based on the control signal, the control signal including start-up timing information and power-down timing information,
        where the power supply is powered down prior to the control signal being sent and powered up based on the start-up timing information, and
        where the power supply is powered down, after being powered up, based on the power-down timing information; and
    control logic to:
        produce a desired voltage signal in response to the current received from the power supply on the main board,
        where the power supply provides the applied voltage to a component in response to receiving the desired voltage signal.

10. The removable module of claim 9, where the logic device includes a field programmable gate array.

11. The removable module of claim 9, where the removable module is one of a plurality of removable modules supported in a relationship with respect to the main board.

12. The removable module of claim 9, where the control logic is one of a plurality of monitors on the removable module, and where others of the plurality of monitors are associated with a plurality of applied voltages, the plurality of applied voltages being provided to one or more components of the removable module using one or more of the plurality of monitors.

13. The removable module of claim 9, where the bias voltage is applied when the removable module is inserted into a header on the main board, and where the bias voltage is removed when the removable module is withdrawn from the header.

14. An electronic device, comprising:
   means for receiving a first control signal from a logic device on a removable module received by a main board of the electronic device, the first control signal including start-up timing information;
   means for providing a first instruction to a direct current to direct current (DC/DC) converter, supported on a main board of the electronic device, in response to and based on the first control signal, the first instruction causing the DC/DC converter to power up based on the start-up timing information included in the first control signal;
   means for providing a current to a monitor on the removable module, based on the first instruction;
   means for receiving a desired output voltage signal from the monitor, in response to the provided current, where the desired output voltage signal is used by the DC/DC converter to generate a supply voltage;
   means for providing the generated supply voltage to a component on the removable module supported on the main board, in response to and based on the desired output voltage signal;
   means for receiving a second control signal from the logic device, the second control signal including power-down timing information; and
   means for removing the supply voltage in response to a second instruction, the second instruction being based on the power-down timing information included in the second control signal received from the logic device.

15. The electronic device of claim 14, further comprising:
   means for providing, based on the first control signal, a third instruction to a second, different DC/DC converter, the third instruction causing the second DC/DC converter to power up based on the start-up timing information included in the first control signal,
   where the DC/DC converter and the second DC/DC converter are powered up in a first sequence that is based on the start-up timing information included in the first control signal.

16. The electronic device of claim 15, further comprising:
   means for providing, based on the second control signal, a fourth instruction to a second, different DC/DC converter, the fourth instruction causing the second DC/DC converter to power down based on the power-down timing information included in the second control signal,
   where the DC/DC converter and the second DC/DC converter are powered down in a second sequence that is based on the power-down timing information included in the second control signal.

* * * * *